(12) United States Patent
Mirkhani et al.

(10) Patent No.: US 6,868,461 B1
(45) Date of Patent: Mar. 15, 2005

(54) LINK LAYER CONTROLLER THAT PROVIDES A MEMORY STATUS SIGNAL TO A NETWORK LAYER SYSTEM IN A COMMUNICATION DEVICE

(75) Inventors: Reza Mirkhani, San Diego, CA (US); Moshe De-Leon, Kiriat Ono (IL); Samuel L. Spencer, San Diego, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 496 days.

(21) Appl. No.: 09/619,736

(22) Filed: Jul. 19, 2000

(51) Int. Cl.⁷ .............................. G06F 13/00; H04L 1/00
(52) U.S. Cl. .......................... 710/56; 710/52; 370/230; 370/235
(58) Field of Search ................................. 370/229–231, 370/235, 419, 469, 395.4–395.42, 444, 412–418; 709/234, 235, 226, 250; 710/52, 56, 57, 40, 44, 17, 19, 29

(56) References Cited

U.S. PATENT DOCUMENTS

| | | | | |
|---|---|---|---|---|
| 5,007,051 A | * | 4/1991 | Dolkas et al. | 370/235 |
| 5,020,054 A | * | 5/1991 | May, Jr. | 370/474 |
| 5,970,069 A | * | 10/1999 | Kumar et al. | 370/402 |
| 6,018,515 A | * | 1/2000 | Sorber | 370/229 |
| 6,104,698 A | * | 8/2000 | Fan et al. | 370/232 |
| 6,108,515 A | * | 8/2000 | Freeman | 434/321 |
| 6,124,878 A | * | 9/2000 | Adams et al. | 725/118 |
| 6,233,224 B1 | * | 5/2001 | Yamashita et al. | 370/231 |
| 6,304,578 B1 | * | 10/2001 | Fluss | 370/413 |
| 6,388,999 B1 | * | 5/2002 | Gorsuch et al. | 370/335 |
| 6,449,281 B1 | * | 9/2002 | Smith | 370/419 |

* cited by examiner

*Primary Examiner*—Ilwoo Park
(74) *Attorney, Agent, or Firm*—Keith Kind

(57) ABSTRACT

A link layer controller comprises a network layer interface, a physical layer interface, and a memory controller. The network layer interface exchanges packets with the network layer system and transfers a status signal to the network layer system. The physical layer interface exchanges the packets with the physical layer system. The memory controller exchanges the packets with the network layer interface, a memory, and the physical layer interface. The memory controller also generates the status signal to indicate available space in the memory.

17 Claims, 4 Drawing Sheets

LINK LAYER CONTROLLER THAT PROVIDES A MEMORY STATUS SIGNAL TO A NETWORK LAYER SYSTEM IN A COMMUNICATION DEVICE

BACKGROUND OF THE INVENTION

1. Field of the Invention

The invention is related to the field of communication systems, and in particular, to a link layer controller that indicates the available space in link layer memory to a network layer system.

2. Statement of the Problem

Communication devices include systems that operate at different layers of the Open Systems Interconnection (OSI) protocol reference model. A communication device typically includes a network layer, a link layer, and a physical layer. The link layer includes a link layer controller and a link layer memory. The link layer memory has transmit buffers that correspond to transmit channels.

To transmit packets from the communication device, the network layer transfers packets in a transmit channel to the link layer controller. The link layer controller transfers the packets to the corresponding transmit buffer in the link layer memory. Subsequently, the link layer controller transfers the packets from the transmit buffer in the link layer memory to the physical layer. The physical layer transfers the packets over the corresponding channel in a communication path coupled to the communication device.

The link layer memory provides a time-buffer between the different transfer rates of the network layer and the physical layer. The network layer attempts to keep the link layer memory loaded with the proper level of packet data. If the network layer transfers too much packet data to the link layer memory, then the link layer memory overflows, and some packet data is lost. This is an over-run condition that causes the link layer controller to request a re-transmission of the lost packet data. Over-runs slow down communication device data transfer and may cause errors. If the network layer transfers too little packet data to the link layer memory, then the link layer memory empties, and no packet data is transferred from the communication device. This is an under-run condition that slows down communication device data transfer. Both over-runs and under-runs are undesirable.

To prevent over-runs and under-runs, the link layer memory must be sized appropriately. Typically, this has required over-sizing the link layer memory. The extra size adds cost and complexity to the link layer system. Unfortunately, the over-sized link layer memory also leads to increased under-runs. Network operators must tolerate link layer controllers that experience inefficient over-runs and under-runs.

SUMMARY OF THE SOLUTION

The invention solves the above problem with a link layer controller that transfers a status signal to the network layer system to indicate the available space in the link layer memory. The network layer system can process the signal to stop transferring packet data when the link layer memory is nearly full. The network layer system can also process the signal to start transferring packet data when the link layer memory is nearly empty. Advantageously, the link layer controller allows the network layer system to avoid over-run and under-run conditions.

The invention includes a link layer controller that comprises a network layer interface, a physical layer interface, and a memory controller. The network layer interface is configured to exchange packets with the network layer system and transfer a status signal to the network layer system. The physical layer interface is configured to exchange the packets with a physical layer system. The memory controller is configured to exchange the packets with the network layer interface, a memory, and the physical layer interface. The memory controller is also configured to generate the status signal to indicate available space in the memory.

In some examples of the invention, the memory has transmit buffers that correspond to transmit channels. The memory controller then generates the status signal to indicate available space in each one of the transmit buffers. The memory controller also controls the size of each one of the transmit buffers in response to external instructions. The memory controller may also provide transmit priority to a transmit channel if the occupancy of its associated transmit buffer exceeds a threshold.

DETAILED DESCRIPTION OF THE INVENTION

Figure 1:
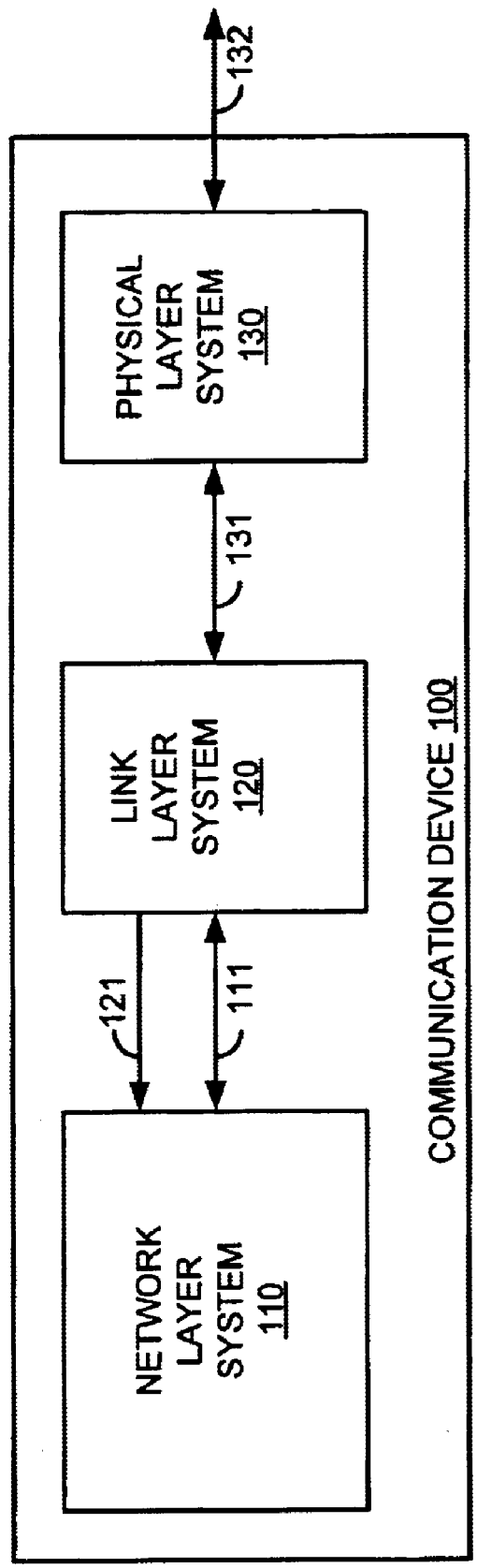
FIG. 1 is a block diagram that illustrates a communication device in an example of the invention.

Communication Device—FIG. 1

FIG. 1 depicts a specific example of a communication device in accord with the present invention. Those skilled in the art will appreciate numerous variations from this example that do not depart from the scope of the invention. Those skilled in the art will also appreciate that various features could be combined to form multiple variations of the invention.

FIG. 1 is a block diagram that illustrates communication device 100 in an example of the invention. Those skilled in the art will appreciate that some conventional aspects of communication device 100 have been omitted for the sake of clarity. Communication device 100 comprises network layer system 110, link layer system 120 and physical layer system 130. Network layer system 110 exchanges packets with link layer system 120 over connection 111. Link layer system 120 exchanges packets with physical layer system 130 over connection 131. Physical layer system 130 exchanges packets with communication path 132.

Network layer system 110 operates at layer three of the OSI protocol reference model. Network layer system 110 transfers packets from incoming links to outgoing links. By selecting the proper outgoing links, network layer system 110 can correctly route the packets across a network.

Link layer system 120 operates at layer two of the OSI protocol reference model. Link layer system 120 handles the individual links that are used by network layer system 110. Link layer system 120 exchanges the packets between the links and the physical layer system 130 for the links.

Physical layer system 130 operates at layer one of the OSI protocol reference model. Physical layer system 130 provides link layer system 120 with an interface to the physical media in communication path 132 that transfers the packets. Physical layer system 130 controls the electrical and mechanical characteristics required to transfer the packets over the physical media.

Link layer system 120 includes a memory that buffers the packets during transfer. Link layer system 120 generates status signal 121 that indicates the available space in the memory. Link layer system 110 transfers status signal 121 to network layer system 110. Network layer system 110 processes status signal 121 to determine when to transfer the packets to link layer system 120. Thus, network layer system 110 can use status signal 121 to optimize performance by avoiding over-run and under-run conditions in the layer two memory.

In some examples of the invention, connection 111 comprises a packet exchange bus that transfers both packets and status signal 121 between network layer system 110 and link layer system 120. The packet exchange bus may also transfer parity information, data validity information, start of packet information, end of packet information, a synchronization signal, and stop transfer signals.

Figure 2:
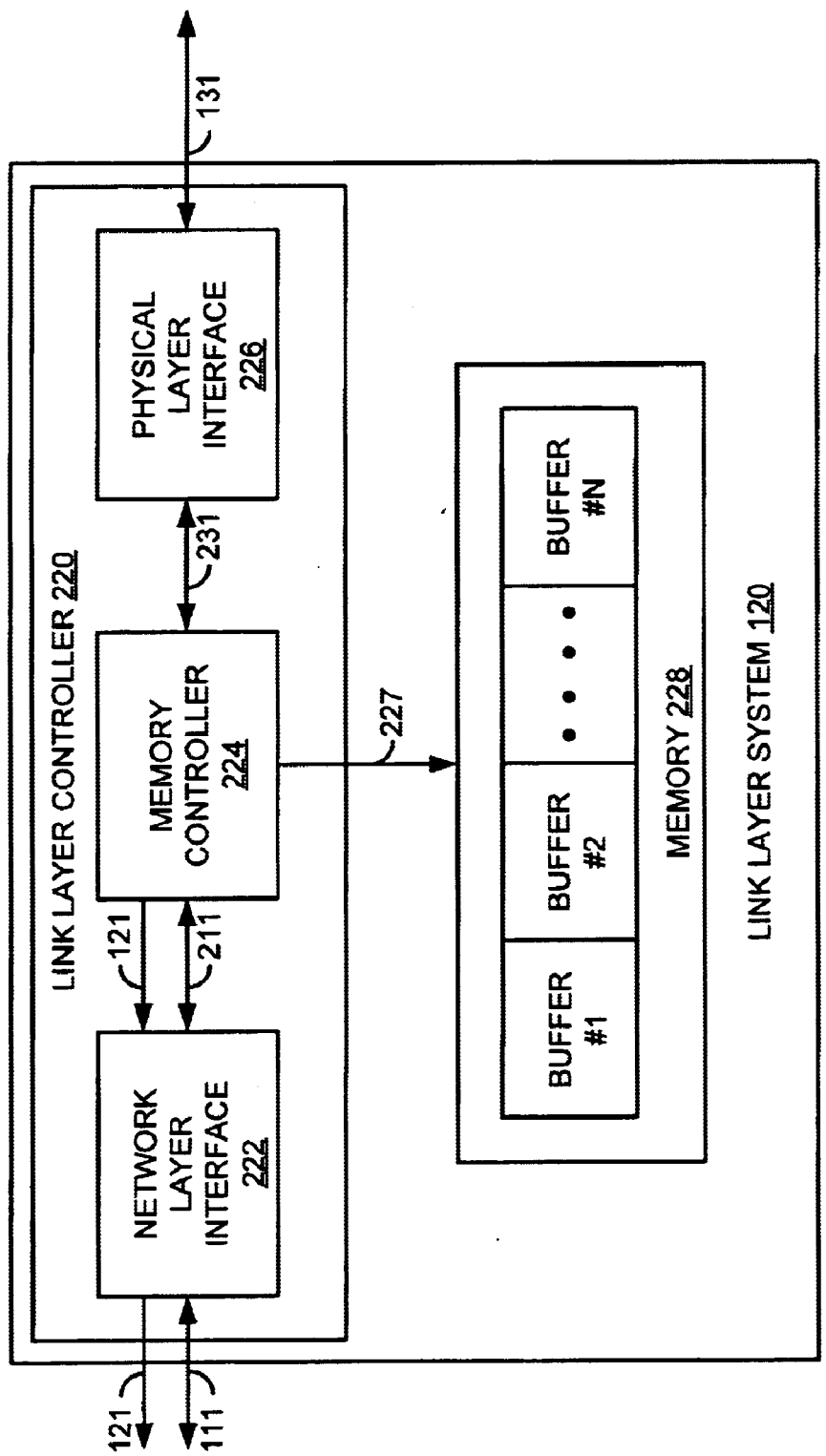
FIG. 2 is a block diagram that illustrates a link layer system in an example of the invention.

Link Layer System—FIG. 2

FIG. 2 depicts a specific example of a link layer system in accord with the present invention. Those skilled in the art will appreciate numerous variations from this example that do not depart from the scope of the invention. Those skilled in the art will also appreciate that various features could be combined to form multiple variations of the invention.

FIG. 2 is a block diagram that illustrates link layer system 120 in an example of the invention. Those skilled in the art will appreciate that some conventional aspects of link layer system 120 have been omitted for the sake of clarity. Link layer system 120 comprises link layer controller 220 and memory 228. Link layer controller 220 comprises network layer interface 222, memory controller 224, and physical layer interface 226. Memory 228 comprises transmit buffers (1–N) that are each associated with a particular transmit channel.

Network layer interface 222 exchanges packets between connection 211 and connection 111. Network layer interface 222 receives and transfers status signal 121. Physical layer interface 226 exchanges packets between connection 231 and connection 131. Memory controller 224 exchanges packets between connection 227 and connections 211 and 231. Memory controller 224 generates status signal 121 to indicate available space in each one of the transmit buffers (1–N) in memory 228.

In some examples of the invention, memory controller 224 controls the size of each one of the transmit buffers (1–N) in response to external instructions. Memory controller 224 may also provide transmit priority to a transmit channel if the occupancy of the associated transmit buffer exceeds a threshold. Thus, memory controller 224 will attempt to transmit from buffers that are getting full.

In operation, network layer system 110 transfers packets to network layer interface 222 in link layer system 120. Network layer interface 222 transfers the packets to memory controller 224, and memory controller 224 transfers the packets to memory 228. Subsequently, memory controller 224 transfers the packets from memory 228 to physical layer interface 226. Physical layer interface 226 transfers the packets from link layer system 120 to physical layer system 130. Physical layer system 132 transfers the packets to communication path 132.

Memory controller 224 generates a status signal 121 to indicate available space for each transmit buffer in memory 228 of link layer system 120. Memory controller 224 transfers status signal 121 to network layer interface 222 which transfers status signal 121 from link layer system 120 to network layer system 110. Network layer system 110 processes status signal 121 to control the transfer of the packets to link layer system 120. Such control includes preventing over-run and under-run.

Figure 3:
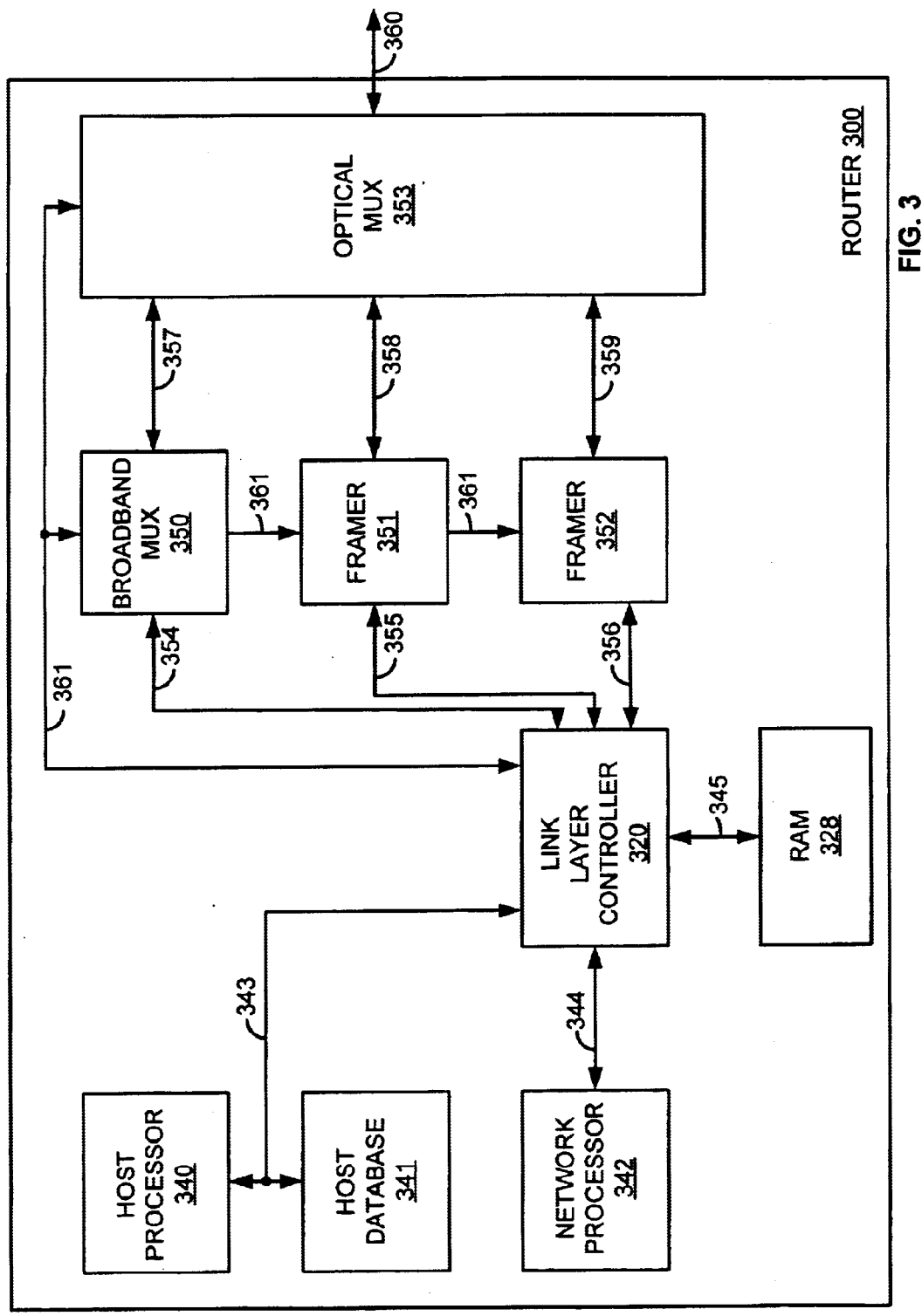
FIG. 3 is a block diagram that illustrates a router in an example of the invention.

Router—FIG. 3

FIG. 3 depicts a specific example of a router in accord with the present invention. Those skilled in the art will appreciate numerous variations from this example that do not depart from the scope of the invention. Those skilled in the art will also appreciate that various features could be combined to form multiple variations of the invention.

FIG. 3 is a block diagram that illustrates router 300 in an example of the invention. Those skilled in the art will appreciate that some conventional aspects of router 300 have been omitted for the sake of clarity. Router 300 comprises link layer controller 320 and Random Access Memory (RAM) 328 that are coupled by connection 345. Router 300 also comprises the following components and connections. Host processor 340 and host database 341 are coupled to each other and to link layer controller 320 by Peripheral Connect Interface (PCI) bus 343. Network processor 342 is coupled to link layer controller 320 by packet exchange bus 344. Link layer controller 320 is coupled to broadband mux 350 and framers 351–352 by respective connections 354–356. Broadband mux 350 and framers 351–352 are coupled to optical mux 353 by respective connections 357–359. Optical mux 353 is coupled to optical communication path 360. Link layer controller 320 shares expansion bus 361 with broadband mux 350, framers 351–352, and optical mux 353.

Link layer controller 320 is a multi-channel synchronous communications controller that formats and de-formats up to 2048 configurable High-level Data Link Control (HDLC) channels. HDLC channels carry HDLC packets with a five byte header to identify channel, message size, and status. HDLC packets can be complete or fragmented, so the header status indicates either a complete or partial HDLC packet.

RAM 328 has a transmit buffer for each HDLC channel, and also has autonomous receive buffers that allow dynamic allocation. The size of each transmit buffer is an integer number of memory blocks of (N) bytes that is programmable per channel. Each transmit buffer also has a programmable occupancy threshold. Link layer controller 320 uses one of eight transmit priority levels for each channel when the corresponding occupancy threshold is reached.

Link layer controller 320 transfers a transmit buffer status signal to network processor 342 to indicate available space in each transmit buffer. Network processor 342 processes the transmit buffer status signal to determine when to transfer the HDLC packets to link layer controller 320. Thus, network processor 342 can use the transmit buffer status signal to optimize performance by avoiding over-run and under-nm in RAM 328.

Link layer controller 320 has a bandwidth of 1.6 Gigabits/second and is implemented in a low-power 1.8 volt CMOS integrated circuit. Link layer controller 320 remains operational without RAM 328. Link layer controller 320 can support multiple protocols: high-level data link control, synchronous data link control, link access procedure balanced, integrated services digital network D-channel, link access procedure D, digital multiplexed Interface, X.25, frame relay, high-speed serial interface, switched mega-bit data service, asynchronous transfer mode, and data exchange interface.

Peripheral Connect Interface (PCI) bus 343 uses a PCI 2.1 interface with a 32 bit multiplexed address/data bus operating at 33 MHz or 66 MHz. Host processor 340 and host database 341 configure link layer controller 320 using PCI bus 343. Configuration includes the dynamic activation and deactivation of channels. Network processor 342 exchanges data with link layer controller 320 over packet exchange bus 344.

Packet exchange bus 344 is 30 bits wide and uses a point-to-point interface. Four of the data lines of packet exchange bus 344 carry the transmit buffer status signal with 16-level programmable granularity per transmit buffer. The transmit buffer status signal is comprised of 2K×4 bit frames that start at the synchronization signal. Each set of four bits represents a channel and indicates the number (M) of memory blocks of (N) bytes that are free in the channel's corresponding transmit buffer in RAM 328. The following table describes packet exchange bus 344.

| | Packet Exchange Bus 344 | |
|---|---|---|
| Lines | Direction | Definition |
| 8 | Link layer controller 320 to network processor 242 | Receive data |
| 1 | Link layer controller 320 to network processor 242 | Receive data parity |
| 1 | Link layer controller 320 to network processor 242 | Receive data validity |
| 1 | Link layer controller 320 to network processor 242 | Receive data start of packet/fragment |
| 1 | Link layer controller 320 to network processor 242 | Receive data end of packet/fragment |
| 8 | Network processor 242 to link layer controller 320 | Transmit data |
| 1 | Network processor 242 to link layer controller 320 | Transmit data parity |
| 1 | Network processor 242 to link layer controller 320 | Transmit data validity |
| 1 | Network processor 242 to link layer controller 320 | Transmit data start of packet/fragment |
| 1 | Network processor 242 to link layer controller 320 | Transmit data end of packet/fragment |
| 4 | Link layer controller 320 to network processor 242 | Per channel transmit buffer status |
| 1 | Link layer controller 320 to network processor 242 | Frame synchronization |
| 1 | Network processor 242 to link layer controller 320 | Do not start any new packet transfers |
| 1 | Link layer controller 320 to network processor 242 | Do not start any new packet transfers |

Connections 354–356 are serial interfaces, and although only three are shown, there could be 32 serial interfaces. Each serial interface has 51.84 MHz for payload and 12.96 MHz for overhead. A serial interface could support 28 DS1/VT 1.5/VC-11 signals, 21 E1 VT2.0/VC-12 signals, or one DS3/E3/STS-1 signal. DS0 signals could also be supported. The serial interfaces are each full duplex with 16,000 timeslots having 2,000 channels. Each serial interface can have an independent configuration of timeslots that can be channelized (T1, Nx64) or unchannelized. The serial interface signals comprise: receive clock, transmit clock, receive data, transmit data, strobe to synchronize start of frame, flow control, indication if time-slot contains data, channel number, packet/fragment size, and fragment type. Fragment type indicates the relation of the fragment to the packet—start, middle, end, or complete packet.

Figure 4:
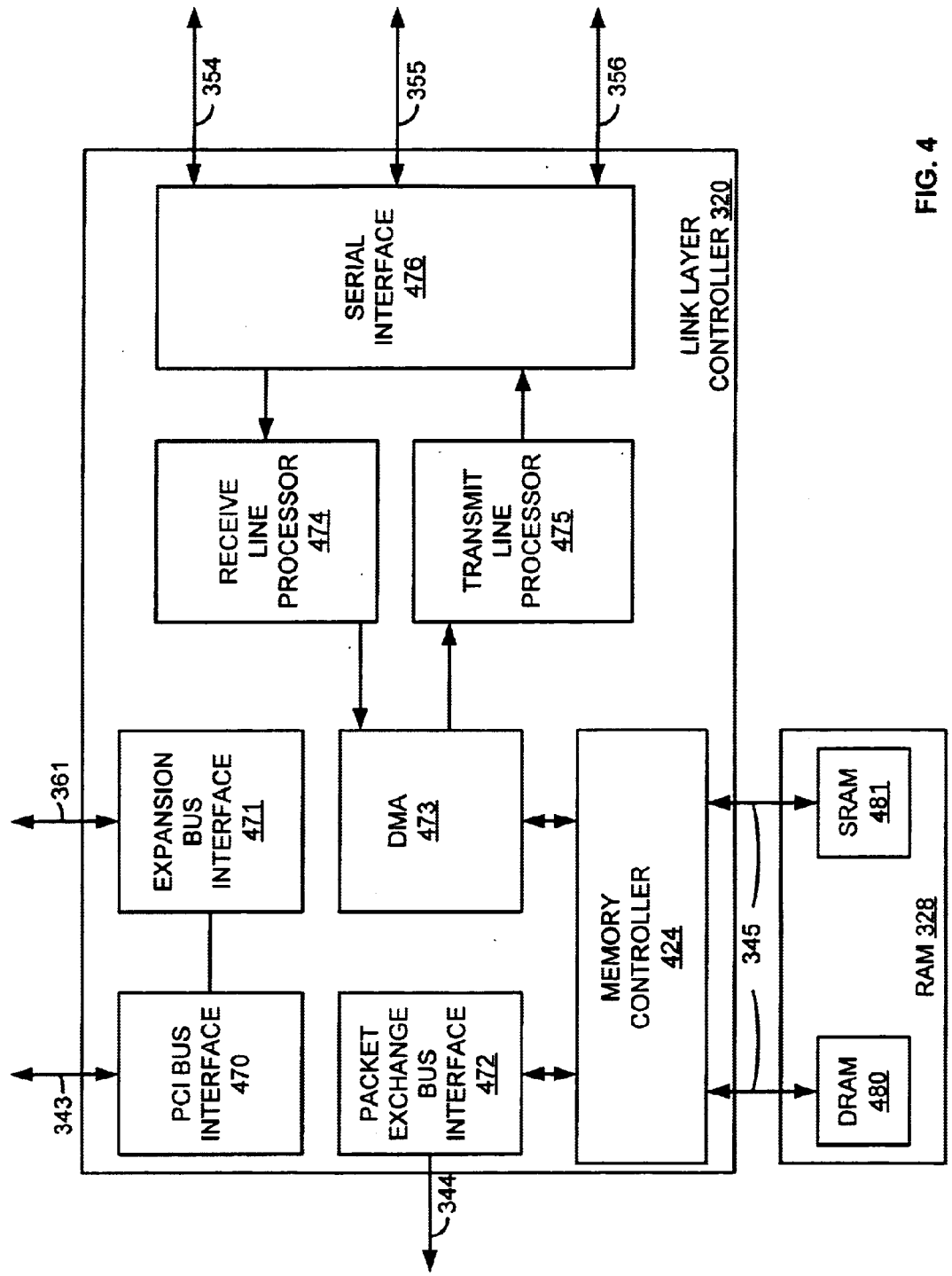
FIG. 4 is a block diagram that illustrates a link layer controller in an example of the invention.

Link Layer Controller—FIG. 4

FIG. 4 depicts a specific example of a link layer controller in accord with the present invention. Those skilled in the art will appreciate numerous variations from this example that do not depart from the scope of the invention. Those skilled in the art will also appreciate that various features could be combined to form multiple variations of the invention.

FIG. 4 is a block diagram that illustrates link layer controller 320 in an example of the invention. Those skilled in the art will appreciate that some conventional aspects of link layer controller 320 have been omitted for the sake of clarity. Link layer controller 320 is coupled to RAM 328. RAM 328 comprises Dynamic RAM (DRAM) 480 and Static RAM (SRAM) 481. DRAM 480 is 64 bits wide and has buffers for each channel that store only packet data. SRAM 481 is 32 bits wide and stores only control data.

Link layer controller 320 comprises the following components and connections. PCI bus interface 470 is coupled to PCI bus 343. Expansion bus interface 471 is coupled to expansion bus 361 and can bridge devices onto PCI bus 343. Packet exchange bus interface 472 is coupled to packet exchange bus 344 and to memory controller 424. Memory controller 424 is connected to Direct Memory Access (DMA) 473. DMA 473 is connected to receive line processor 474 and transmit line processor 475. Receive line processor 474 and transmit line processor 475 are connected to serial interface 476 which is coupled to connections 354–356.

In operation, network processor 342 transfers HDLC packets to packet exchange bus interface 472 over packet exchange bus 344. Packet exchange bus interface 472 transfers the HDLC packets to memory controller 424, and memory controller 424 transfers the HDLC packets to DRAM 480 in RAM 328. Subsequently, memory controller 424 transfers the HDLC packets from DRAM 480 to DMA 473. DMA 473 transfer the HDLC packets to transmit line processor 475, and transmit line processor 475 transfers the HDLC packets to serial interface 476. Serial interface 476 transfers the HDLC packets from link layer controller 320 to broadband mux 350, framer 351, and framer 352. Broadband mux 350, framer 351, and framer 352 transfer packets to optical mux 353 which transfers the packets over optical communication path 360.

Memory controller 424 generates a transmit buffer status signal to indicate available space for each transmit buffer in DRAM 480. Memory controller 424 transfers the transmit buffer status signal status signal to packet exchange bus interface 472 which transfers the transmit buffer status signal from link layer controller 320 to network processor 342 over packet exchange bus 344. Network processor 342 processes the transmit buffer status signal to control the transfer of the packets over the HDLC channels to link layer controller 320. Such control includes preventing over-run and under-run in DRAM 480.

The above-described link layer controllers may operate according to instructions stored on storage media. A processor retrieves and executes the instructions from a storage media. Some examples of instructions are software and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits and logic circuitry. Those skilled in the art are familiar with instructions, processors, and storage media.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A link layer contoller comprising:
   a network layer interface configured to exchange packets with a network layer system and transfer a status signal to the network layer system;
   a physical layer interface configured to exchange the packets with a physical layer system;
   a memory comprising a plurality of transmit buffers wherein each of the plurality of transmit buffers corresponds with a transmit channel of a plurality of transmit channels; and
   a memory controller configured to exchange the packets with network layer interface, exchange the packets with the memory, exchange the packets with the physical layer interface, determine available space in at least one of the plurality of transmit buffers, if occupancy on a first the transmit buffer corresponding with a first transmit channel exceeds a threshold, then prioritize the transmit channels to packets from the first transmit buffer corresponding with the first transit channel, and generate the status signal to control transfer of packets to prevent over-run in the plurality of transmit buffers.

2. The link layer controller of claim 1 wherein the status signal indicates the available space in each of the transmit buffers.

3. The link layer controller of claim 2 wherein the memory controller is configured to control a size of each of the transmit buffers in response to external instructions.

4. The link layer controller of claim 1 wherein the network layer interface is configured to use a packet exchange bus to exchange the packets with the network layer system and to transfer the status signal to the network layer system.

5. The link layer controller of claim 4 wherein the network layer interface is configured to use the packet exchange bus to exchange parity information with the network layer system.

6. The link layer controller of claim 4 wherein the network layer interface is configured to USC the packet exchange bus to exchange data validity information with the network layer system.

7. The link layer controller of claim 4 wherein the network layer interface is configured to use the packet exchange bus to exchange start of packet information and end of packet information with the network layer system.

8. The link layer controller of claim 4 wherein the network layer interface is configured to use the packet exchange bus to transfer a synchronization signal to the network layer system.

9. The link layer controller of claim 4 wherein the network layer interface is configured to use the packet exchange bus to exchange stop transfer signals with the network layer system.

10. A method of operating a communications device that includes a memory comprising a plurality of transmit buffers, wherein each of the plurality of transmit buffers corresponds with at channel of a plurality of transmit channels, the method comprising:
    transferring packets between a network layer system and a link layer system;
    transferring the packets between the link layer system and a physical layer system;
    transferring the packets between the physical layer system and a communication path;
    generating a status signal in the link layer system indicating available space in each of the plurality of transmit buffers; and
    if occupancy on a first transmit buffer corresponding with a first transmit channel exceeds a threshold, then prioritizing the transmit channels to transmit packets from the first transmit buffer corresponding with the first transmit channel.

11. The method of claim 10 further comprising:
    controlling a size of each of the transmit buffers in the link layer system in response to instructions from the network layer system.

12. The method of claim 10 wherein transferring the packets between the network layer system and the link layer system comprises using a packet exchange bus.

13. The method of claim 12 further comprising transferring parity information over the packet exchange bus.

14. The method of claim 12 further comprising transferring data validity information over the packet exchange bus.

15. The method of claim 12 further comprising transfer start of packet information and end of packet information over the packet exchange bus.

16. The method of claim 12 further comprising transferring a synchronization signal over the packet exchange bus.

17. The method of claim 12 further comprising transferring stop transfer signal over the packet exchange bus.

* * * * *